Oct. 16, 1928.
J. W. FONTAINE
1,687,859
SUSPENSION DEVICE FOR MAPS, ETC
Filed Nov. 10, 1926
2 Sheets-Sheet 1
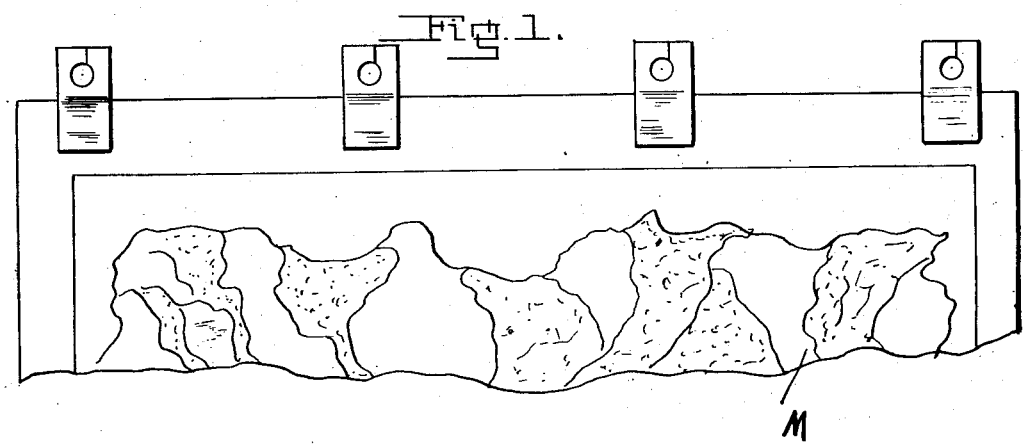
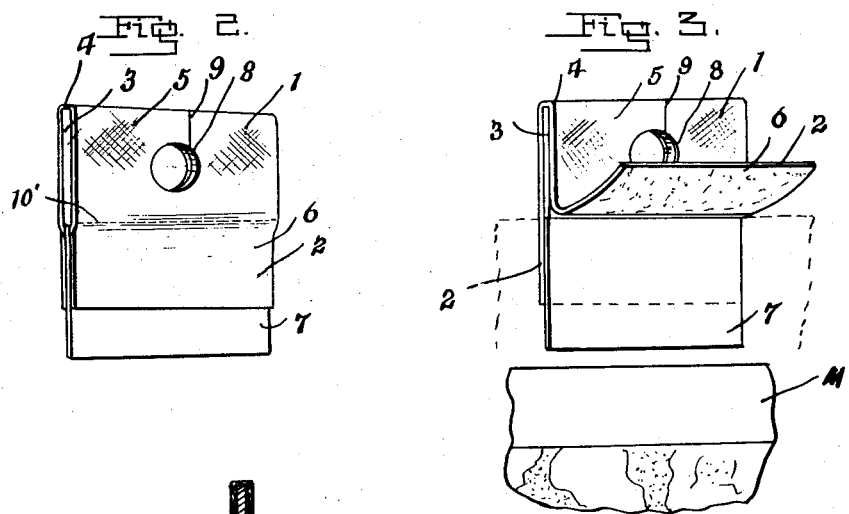
Inventor
J. W. Fontaine
By Lacey & Lacey, Attorneys Oct. 16, 1928.

J. W. FONTAINE 1,687,859

SUSPENSION DEVICE FOR MAPS, ETC

Filed Nov. 10, 1926

Inventor

J. W. Fontaine

By Lacey & Lacey, Attorneys

Patented Oct. 16, 1928.

1,687,859

UNITED STATES PATENT OFFICE.

JESSE W. FONTAINE, OF SALINAS, CALIFORNIA, ASSIGNOR TO HARRY W. HALL, OF SAN FRANCISCO, CALIFORNIA.

SUSPENSION DEVICE FOR MAPS, ETC.

Application filed November 10, 1926. Serial No. 147,568.

This invention relates to improvements in filing devices and more particularly to an improved means for filing maps, charts, drawings, blue prints, and, in fact, any sheet material to which reference is to be made, and the invention contemplates the provision of an extremely simple and inexpensive suspension means which may be readily attached to the upper margin of a map or the like to be suspended and which will securely support the map when the device is adapted to suspension elements such as rods.

Another object of the invention is to provide a device for the purpose stated which may be applied to the margin of a map or the like and securely attached thereto without the employment of any extraneous fastening means and without any mutilation whatsoever of the map or the like.

Another object of the invention is to provide a suspension device for the purpose stated so constructed that it may be disengaged from the map or the like at any time, if desired, and may be repeatedly employed for an almost indefinite period of time without losing its usefulness.

Another object of the invention is to provide a suspension device which may be adapted to a suspension rod and readily applied to the rod and removed therefrom without disturbing the suspension devices of maps or the like at either side thereof, so that any map or the like suspended by the devices may be removed and consulted and replaced without in any way disturbing any other suspended map or the like.

In the accompanying drawings:

Figure 1 is a view illustrating in elevation, the upper portion of a map sheet and the devices embodying the invention applied to the sheet in a manner to suspend the same from supporting rods or the like.

Figure 2 is a perspective view of one of the suspension devices as it will be placed upon the market and before it has been used.

Figure 3 is a view similar to Figure 2, illustrating the manner in which the device is to be manipulated at the time the margin of the map is adapted thereto for suspension.

Figure 4 is a vertical sectional view through the device applied to the map.

Figure 5:
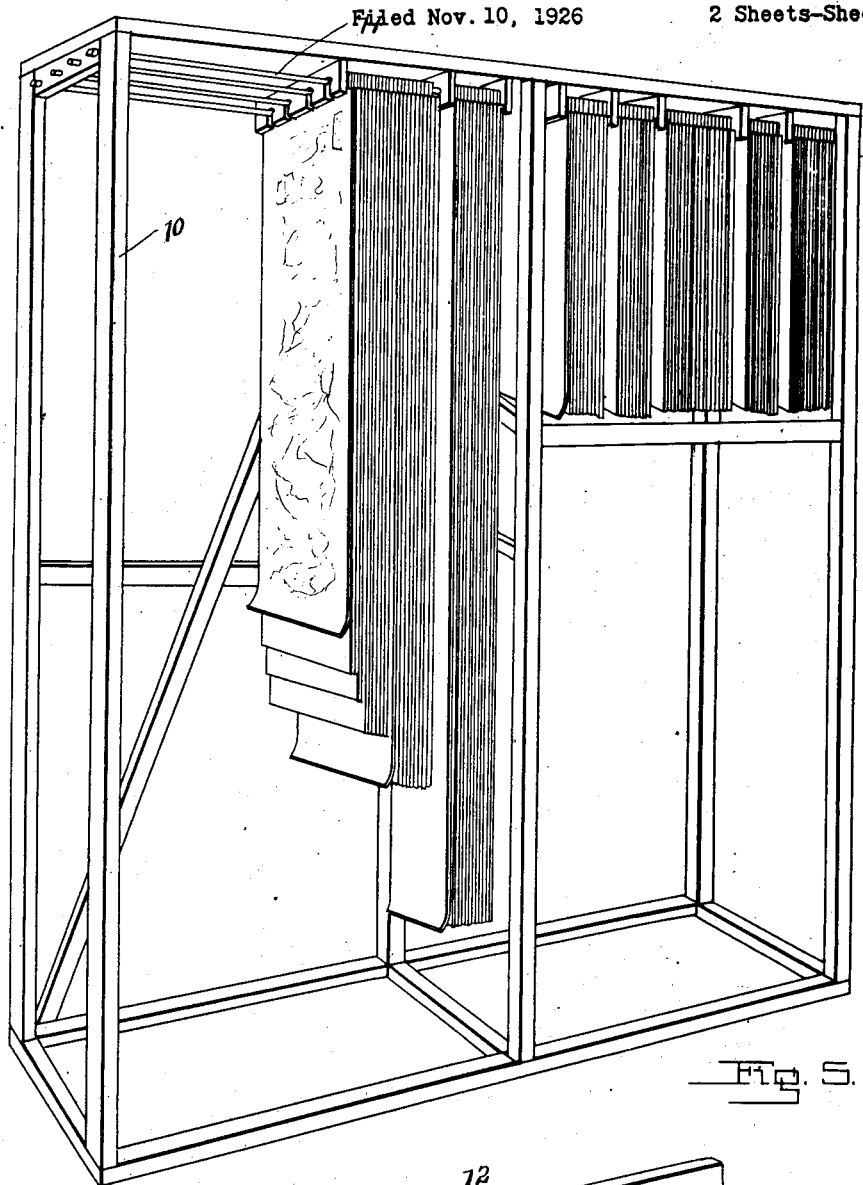
Figure 5 is a perspective view illustrating the manner in which a number of maps may be suspended within a cabinet.
Figure 6:
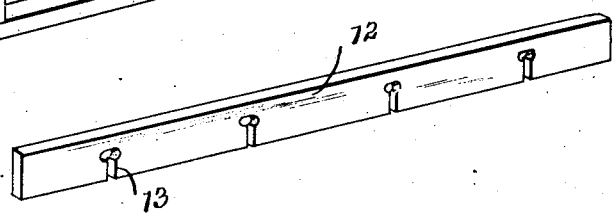
Figure 6 is a perspective view of a rider bar which is preferably employed in connection with the suspension devices of the invention.

The suspension device embodying the invention is in the form of a tab adhesively attachable to the margin of a map or the like to be suspended, and the said tab comprises a head which is indicated in general by the numeral 1, and attaching flaps which are indicated in general by the numeral 2. The head 1 comprises a rectangular or other suitably shaped strip 3 which is of pyroxyline or celluloid, or other relatively stiff material. Pyroxyline or celluloid has been found to possess certain inherent characteristics making it particularly desirable for use in my invention. Therefore, the use of this material is to be preferred to other substances. A strip of adhesive tape is applied over the upper edge of the strip 3, as indicated by the numeral 4, and adhesively secured to the opposite faces of the strip at its portions which are indicated by the numeral 5, so that the reenforcing strip 3 is completely enclosed by the folded adhesive strip. The end portions of the adhesive strip 5, which portions are indicated by the numeral 6, are extended downwardly a suitable distance below the lower edge of the strip 3, and their adhesive-bearing sides are pressed against and temporarily adhesively united to a strip 7 of tracing linen or similar tough and yet thin and flexible material having a relatively smooth finish, the upper edge of the strip 7 abutting against the lower edge of the reenforcing strip 3, as clearly shown in Figures 2, 3 and 4 of the drawings, and the lower marginal portion of the said strip 7 being extended downwardly below the lower edges of the portions 6 of the adhesive strip 5. The strips are all in marginal registration at their lateral edges and an opening 8 is formed through the portions 5 of the adhesive strip and through the reenforcing strip 3, and an incision 9 is likewise formed in these strips extending between the upper side of the opening 8 and the upper edge of the head 1 of the tab. The opening 8 is preferably located midway between the ends of the head 1 of the tab and affords means whereby, by slightly flexing the head of the tab above the opening at the opposite sides of the incision 9, the tab may be readily applied to and disengaged from a supporting rod. The opening is disposed above the lower edge of the strip of celluloid, so that a bridge of celluloid is provided below the opening, which resists deformation of the shoulders above the opening, and the bridge may be of the same depth as the incised portion or may be greater in depth, to provide the desired deformation resistance.

The suspension devices will be placed upon the market in the condition shown in Figure 2 of the drawings, and when it is desired to suspend a map or the like, a number of the suspension devices are applied at suitable intervals to the upper margin of the map, as shown in Figure 1 of the drawings. In applying the suspension device, the projecting lower marginal portion of the strip 7 is grasped by the fingers of one hand and one of the flaps 6 is pulled away from the said strip until the lower edge of the strip 3 is exposed, as shown in Figure 3 of the drawings. The device is then disposed against the margin of the map, which is indicated by the reference letter M in the drawings, in such manner that the exposed side of the strip 7 will contact the back of the map sheet and the upper margin of the said sheet will abut squarely against the lower edge of the strip 3. The said flap 6 is then turned down and pressed firmly into engagement with the face of the map sheet at the upper margin thereof, as shown in Figure 4 of the drawings, and as indicated in dotted lines in Figure 3. In pulling the flap 6 away from the strip 7, some of the adhesive coating upon the said flap 6 will adhere to and remain upon the face of the strip 7 so that when the flap 6 is restored to its original position and pressure is exerted against the opposite sides of the device, the device will be securely anchored to the margin of the map sheet. At this point it will be understood that inasmuch as adhesive tape is employed in providing the portions 5 and 6, this tape usually comprising linen cloth and a rubber cement adhesive on one face thereof, the same flap 6 may be used a great number of times if the devices are transferred from one map to another. Furthermore, it will be evident that inasmuch as the other flap 6 remains in facial contact with the strip 7, its adhesive bearing surface will be maintained in a fresh condition so that if the first mentioned flap should lose its adhesiveness, the device will still be useful by employing the said other flap.

If desired, one of the flaps may be adhesively applied to one side of the map sheet and then the strip 7 may be removed and the other flap may be adhesively pressed against the other side of the map sheet, this being a matter of choice and depending on the size and weight of the map to be suspended. Likewise, where a group of maps are to be suspended, one or more staples may be fastened through the maps and the flap 6. However, it will be found that the suspension device is sufficiently strong and will be sufficiently securely held to the maps by the adherence of its flaps 6 thereto, as to ordinarily require no extraneous fastening means.

As before stated, the opening 8 provides for suspension of the devices from rods and a convenient arrangement is shown in Figure 5 of the drawings, whereby any desired number of maps may be suspended and readily consulted. In this figure, the numeral 10 indicates in general a cabinet or frame structure and the numeral 11 indicates rods which are arranged in parallel relation within the top portion of the structure and upon which are slidably mounted rider bars 12 having notches 13 opening through their lower edges and adapting them to be engaged over the said rods. In arranging the maps, the suspension devices will be applied to the upper margins of the map sheets at intervals corresponding to the spacing of the rods 11, and by flexing the portions of the suspension devices at the opposite sides of the incisions 9, the devices may be readily fitted to the rods so as to suspend the map and so as to permit of sliding of the map back and forth along the rods. At intervals, for example, every hundred maps, one of the rider bars will be placed upon the rods 11 so that all of the maps may be simultaneously moved by sliding this bar along the said rods.

When it is desired to remove any one of the maps suspended in the manner shown in Figure 5, it is only necessary to pull downwardly and inwardly in a gentle manner on the map, whereupon the portions of the suspension tab at the opposite sides of the slit 9 will be spread apart so as to successively disengage from the rod. To prevent the flaps 2 from becoming detached from the head 3 when pulled open, a line of stitches 10' can be used, as shown in Figure 2 of the drawings. This stitching definitely limits the extent to which the flaps 6 may be pulled apart preparatory to attaching the device to a map. Furthermore when the flaps are stripped back from the insert 7 to the line of this stitching, the edge of the map can be alined with this stitching to insure proper and accurate positioning of the device upon the map.

My device may be repeatedly clipped over and removed from a suspension rod without apparent injury. I attribute this result to my discovery that pyroxyline or celluloid has certain peculiar properties making it particularly desirable as a substance for the reinforcing strip 3. Although pyroxyline is comparatively flexible and permits the device to be readily clipped over a rod, it does not take a permanent deformation and always returns to its original form when upon or off of a rod. Furthermore it permits the device to be readily slid along a metal rod and forms an effective adhesive engagement with the adhesive tape.

Having thus described the invention, what I claim is:

1. A device adapted to be detachably secured to a support rod for suspending maps comprising a folded strip of material having the opposed surfaces of its fold flaps coated with an adhesive, means for detachably securing said strip to a support rod, a strip of reinforcing and stiffening material interposed between the said flaps and of less depth than the flaps whereby the free end portions of the flaps will extend below the lower edge of said reinforcing and stiffening strip, said free end portions constituting means for securing said strip to the edge of a map, and a line of stitching run through the said flaps beneath the lower edge of the said reinforcing and stiffening strip.

2. A device adapted to be clipped over a support rod for suspending maps comprising a sheet of pyroxyline, a strip of material folded at substantially its medial line over an edge of said sheet, both the sheet and the folds of the strip having an aperture therethrough adjacent the fold and having an incision extending from the edge of the fold to the aperture, whereby the pyroxyline reinforces the strip about the aperture and the incision, and means for attaching said device to one edge of a map to be suspended.

3. A suspension device for maps adapted to be detachably clipped over a support rod comprising a strip of pyroxyline having an aperture therein adjacent its upper edge and an incision extending from said aperture to said edge and means for attaching said strip to one edge of a map to be suspended.

4. A suspension device for maps adapted to be detachably clipped over a support rod comprising a resilient strip of pyroxyline, said strip having an aperture therein adjacent its upper edge for receiving a supporting rod, and having an incision extending from said aperture to said edge for permitting the device to be clipped over a rod, another strip of flexible material secured to one side of said first mentioned strip and projecting downwardly from its lower edge, the projecting portion of said flexible strip having an adhesive surface and constituting means for attaching said device to one edge of a map to be suspended.

5. A suspension device for maps adapted to be detachably clipped over a support rod comprising a resilient pyroxyline strip having an aperture therein adjacent its upper edge and an incision extending from said aperture to said edge, so that the strip may be clipped over said rod, and means for attaching said device to one edge of a map to be suspended comprising a strip of flexible material secured to said pyroxyline strip, said strip of flexible material projecting downwardly from the lower edge of said pyroxyline strip and having an adhesive surface for attaching said device to one edge of said map.

6. A suspension device for maps adapted to be detachably clipped over a support rod comprising a strip of pyroxyline having an aperture therein substantially spaced from the upper and lower edges of the strip whereby a deformation resistant bridge is formed below the aperture, and having an incision extending from said aperture to the upper edge, and means for attaching said strip to one edge of a map to be suspended.

7. A device adapted to be removably clipped over a support rod for suspending maps comprising a relatively flat strip of material having an aperture therein and an incision extending from the aperture to one edge of the strip for removably securing said strip to a support rod, a flexible flap projecting from one edge of said strip, a normally and inherently adhesive gummed surface provided on one face of said flap, and a removable smooth surfaced strip covering and adhesively engaged with the entire gummed surface of the flap.

In testimony whereof I affix my signature.

JESSE W. FONTAINE. [L. S.]